(12) United States Patent
Jowett

(10) Patent No.: US 6,977,038 B2
(45) Date of Patent: Dec. 20, 2005

(54) WASTEWATER TREATMENT STATION IN SHIPPING-CONTAINER

(76) Inventor: E. Craig Jowett, P.O. Box 385, 177 Cobblestone Place, Rockwood, Ontario (CA) N0B 2K0

(*) Notice: Subject to any disclaimer, the term of this patent is extended or adjusted under 35 U.S.C. 154(b) by 39 days.

(21) Appl. No.: 10/365,700

(22) Filed: Feb. 13, 2003

(65) Prior Publication Data
US 2004/0079691 A1 Apr. 29, 2004

(30) Foreign Application Priority Data
Oct. 25, 2002 (GB) .................................. 0224760

(51) Int. Cl.⁷ .............................................. C02F 3/04
(52) U.S. Cl. ...................... 210/220; 210/151; 210/241; 210/261; 210/202; 210/532.2
(58) Field of Search ............................... 210/220, 241, 210/150, 151, 262, 261, 199, 202, 532.2

(56) References Cited

U.S. PATENT DOCUMENTS

| | | | |
|---|---|---|---|
| 5,657,896 A | | 8/1997 | Matias |
| 5,707,513 A | * | 1/1998 | Jowett et al. ............... 210/150 |
| 6,308,850 B1 | | 10/2001 | Coom et al. |
| 6,308,855 B2 | | 10/2001 | Tisi |
| 6,393,775 B1 | | 5/2002 | Staschik |
| 6,398,053 B1 | | 6/2002 | Thornsen |
| 2002/0033363 A1 | * | 3/2002 | Hasegawa ................... 210/151 |

* cited by examiner

Primary Examiner—Duane Smith
Assistant Examiner—Douglas J. Theisen
(74) Attorney, Agent, or Firm—Anthony Asquith Corp.

(57) ABSTRACT

A standard 20 ft or 40 ft sea-freight shipping container is configured as a septic tank, or as an aerobic trickle filter station. The shipping-container is lined with a watertight shell or liner. The liner may be a prefabricated separate structure inserted into the container, and supported from the container walls. Or, the liner may be actually constructed inside the container, again taking mechanical support from the container walls. The openable doors at the end of the standard container are retained, a wall being added to the shipping-container a foot or two inside the doors to form the tank, leaving a utility room for pipework, valves, pumps, etc.

3 Claims, 14 Drawing Sheets

WASTEWATER TREATMENT STATION IN SHIPPING-CONTAINER

This invention relates to configuring a shipping-container, and more particularly an ISO-standard sea-freight shipping-container, as a water treatment facility.

Water treatment tanks have been placed in shipping-containers for shipping purposes, wherein the tanks are taken out of the shipping-containers upon arrival at the installation site. Shipping-container have been used to house the utilities for a building, in which one of the utilities is water treatment, including a septic tank. The structure of the shipping-container has been employed to enhance the rigidity and strength of the water tank. By contrast, the present invention is aimed, not at placing a water tank inside the shipping-container, but at so adapting the shipping-container that the shipping-container itself now serves as the water tank.

In the invention, it is not required that the shipping-container be re-usable as a shipping-container. Rather, the shipping-container is prepared, in a factory, for service as a wastewater treatment-tank, but the container still retains its character as a shipping-container to the extent that it can be picked up and transported, as an integrated whole structure, e.g on a truck, to the site. Once there, the shipping-container/wastewater treatment-tank is unloaded as a whole unit. The unit can be made ready for use quickly and easily, almost on a turn-key basis, without the need for specially skilled installation technicians on-site.

If necessary, the shipping-container/wastewater treatment-tank can be removed, as a unit, if no longer needed (for example, when the water treatment is associated with a temporary habitation.) However, the economics of the shipping-container/wastewater treatment-tank unit are advantageous also when the water treatment is intended to be permanent. (Of course, the unit is intended for use in places where access to municipal water treatment facilities is non-existent or limited.)

Water treatment stations fall into a number of categories. These include (a) e.g septic treatment, in which a relatively large body of wastewater remains still, to allow solids to settle out of the water, and to allow (anaerobic) digestion-type treatment reactions to take place; and include (b) e.g aerated trickle treatment, in which the water is aerated, whereby (aerobic) oxidation-type treatment reactions are promoted; and include (c) e.g fine air-bubble diffusers in a standing body of water, termed bubbling aeration systems. The water treatment container as provided in the invention is suitable for all these uses.

It is stressed that the invention is not aimed at providing a means for shipping a water treatment tank, but is aimed rather at adapting the shipping-container itself for use as a water treatment tank. The invention provides a liner which more or less fills the available space inside the container. In some cases, the liner may be structured as a pre-fabricated enclosed tank, which is inserted into the shipping-container; in other cases, the liner may be structured as a liner that is fabricated in-situ, i.e is fabricated actually inside the container; in other cases again, then liner may be structured as a sprayed coating applied directly to the inside surfaces of the walls of the shipping-container. The designer preferably should aim to utilise the available volume inside the shipping-container efficiently, yet economically.

In the invention, the highly-robust mechanical structure of the shipping-container is used to enhance the robustness of the liner. The liner can be relatively fragile or flimsy—and therefore economical. If the liner were itself an inherently robust water tank, which was capable of being used operationally without structural support, there would be little point in employing the invention. A key feature of the invention is to harness the inherent robustness of the shipping-container to enhance the robustness of the water-containing chamber. Thus the water chamber itself, now configured as a liner within the shipping-container, can be very economical. Shipping-containers can be obtained very economically, in the context of structures for effecting water treatment, and of course they can be shipped economically.

It is recognised that the shape and size of the standard shipping-container is very well suited for water treatment. The cross-sectional shape of the standard container is nominally 8 ft wide and 8 ft 6 in high: if the cross-section were much larger than that, there might be a danger that pathways might develop in a body of water undergoing treatment inside the container, whereby some portions might become stagnant, or at least might not contribute efficiently to the treatment; on the other hand, if the cross-section were much smaller, there might be a danger that the water would have enough of a velocity of passage as to inhibit the desired settling-out of solids. The cross-section is roughly square, which again is suitable for water treatment, as compared with a short wide (or tall narrow) rectangle of the same cross-sectional area.

The standard sea-freight shipping-container is well suited also as to overall volume. It is recognised that a shipping-container, when configured as a water treatment facility, has enough volumetric capacity to be commercially useful. The 40 ft size of container, especially, can be engineered to contain, typically, 50,000 liters of water, which is ideal for such applications as golf-courses, camp grounds, residential resorts, etc. Where larger facilities are required, more shipping-containers can simply be added, in a modular building-block fashion. It may be noted that the cost of returning later, to add an extra shipping-container, is hardly more than the cost of installing the extra container in the first instance; therefore, the designer can engineer the system just for the known short-term needs, and need leave little margin for future increases.

The invention aims to configure a shipping-container, and especially an ISO standard sea-freight shipping-container, as a lined watertight water treatment chamber. That is to say, the shipping-container itself is the water tank. The shipping-container becomes the water tank right from the start of manufacture, in-factory, and remains so through transport to the installation site, through installation, and throughout the service life of the water tank. This aspect should be contrasted with transporting a water tank in a shipping-container, where the shipping-container is removed after delivery. It should also be contrasted with placing a small water tank inside a shipping-container, where the container houses many other utilities as well. In the invention, it is recognised that a standard shipping-container is highly suited, not to house a small water tank, but to serve, itself, as the water treatment tank.

It is recognised that the bare inside walls of a standard shipping-container are not suitable to be contacted directly by wastewater undergoing treatment. Therefore, a liner must be provided inside the container. For efficiency of use of the available volume, the liner should be close to the inside surface of the container walls. As will be explained, it is possible for the liner to be so arranged that almost 100% of the volume of the container can be used to contain water undergoing treatment. It will be explained also that the liner may be configured to utilise only about 40% of the container volume, and yet still it can be recognised that the shipping-container (i.e the lined shipping-container) is itself serving as the water treatment tank. However, a 40% volume utilisation is the bottom limit; below that, it should be understood that the attempt was not being made to configure the shipping-container itself as the water treatment tank.

DETAILED DESCRIPTION OF PREFERRED EMBODIMENTS

The apparatuses shown in the accompanying drawings and described below are examples which embody the invention. It should be noted that the scope of the invention is defined by the accompanying claims, and not necessarily by specific features of exemplary embodiments.

Figure 1:
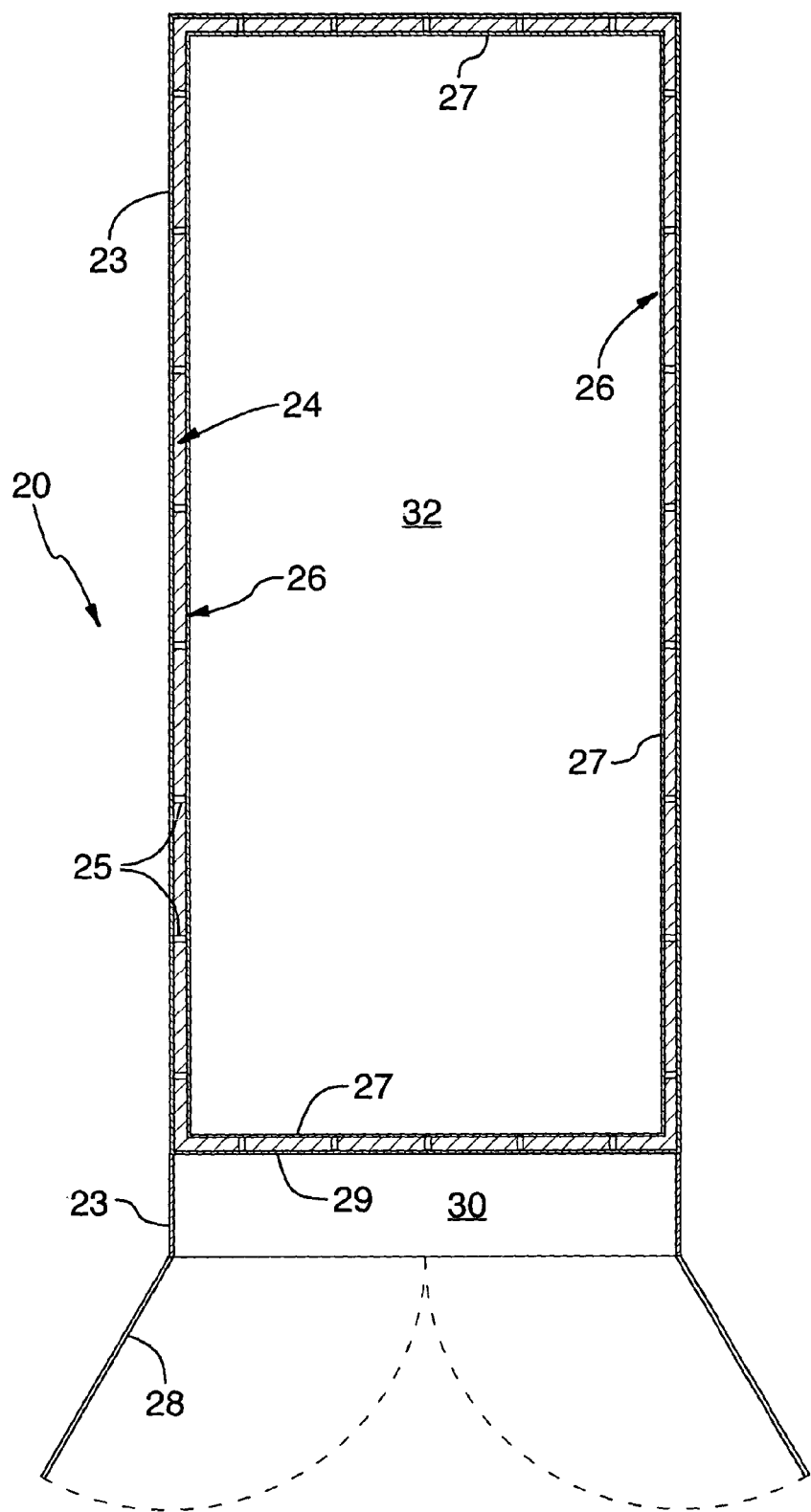
FIG. 1 is a plan view, in cross-section, of a shipping-container that has been adapted for use as a wastewater treatment tank, in accordance with the invention.
Figure 2:
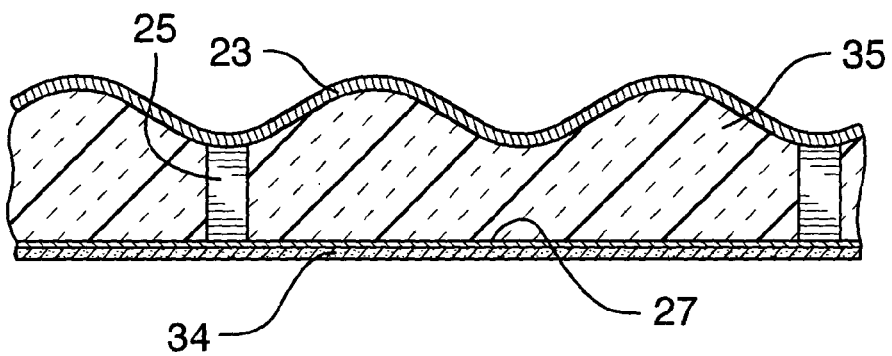
FIG. 2 is a close-up of a portion of the wall of the container of FIG. 1.

The outer-wall of the shipping-container 20 is of the usual corrugated steel plate (which is shown flat in FIG. 1, for ease of illustration). The outer-wall 23, is part of the steel structure of the shipping-container itself. In accordance with the invention, a liner in the form of an inner-wall 24 has been provided, inside the outer-wall. FIG. 2 is a close-up of a portion of the inner and outer walls.

The inner-wall 24 is made up from a number of components. Steel studs 25 are welded to the inside surface of the outer-wall, and an inner-skin 26 or liner is fixed to the studs. The inner-skin comprises flat sheets 27 of steel.

The shipping-container 20 has a pair of doors 28 at one end, which open outwards. The sheets 27 that will form the inner skin 26 are inserted inside the shipping-container through these doors. The sheets 27 are then welded together, inside the shipping-container, to form the inner-skin. The welder should aim to make the joints between the sheets continuously watertight.

An added-wall 29 is inserted, inside the doors, near the door-end of the container, the added-wall being welded to the outer-wall 23 of the shipping-container. The sheet or sheets that form the added-wall 29 component of the liner or inner skin are not supported by studs, from the outer-wall, as are the other components of the inner-skin. The added-wall is fixed to the outer-wall 23 only at its edges. Therefore the added-wall has to span across a large distance, i.e across the width (and height) of the container. The added-wall should be of robust construction, and should be suitably braced with respect to the side-walls, and floor and roof, of the container.

The added-wall 29 creates a space between the container doors 28 and the added-wall 29. This space may serve as a utility-room 30, to house the components (pipes, pumps, valves, switches, control components, etc) as are required for facilitating the wastewater treatment processes. The doors 28 remain openable/closable to provide access to this utility-room.

The sheet steel of the inner-skin 26 can be thinner (being e.g three to five mm thick) than it would have to be if the inner-skin were the sole support of the water contained therewithin, because the inner-skin takes structural support from the corrugated steel plates of the outer-wall 23.

With the added-wall 29 and the sheets 27 all in place, the inner-skin forms a complete lined-watertight hollow liner-chamber 32. The inner-skin 26 is notionally watertight, in that the sheets that make up the inner-skin are continuous-seam welded; however, the continuous seams extend for many tens of metres, and the sheets that make up the inner-skin are of relatively thin sheet metal, whereby there may be some small holes in the seams. These are not important, provided they are small, because they will be sealed by the layer of epoxy sealant which is now sprayed inside the inner-skin.

From inside the interior chamber of the shipping-container, an operative sprays a layer 34 of coal tar epoxy sealant onto the inside surface of the steel sheets 27 that make-up the inner-skin 26. The metal of the inner-skin should of course be clean and dry, to the extent necessary to ensure the correct adhesion of the epoxy layer. The epoxy layer 34 has a thickness of one or two mm.

The layer 34 completely covers the metal of the inner skin 26. Access hatches in the liner-chamber 32 are also covered with the epoxy, and are provided with suitable watertight seals. Thus, not only is the liner-chamber completely watertight, but no portion of the metal of the inner-skin is exposed, as metal, to the wastewater undergoing treatment, inside the liner-chamber 32. Wastewater can have corrosive components that might damage unprotected steel.

Wastewater, upon entering the liner-chamber 32, is generally at room temperature. The (bio-chemical) treatment reactions require that the water not fall below about ten deg C. Typically, water remains in the treatment chamber for at least a day, and sometimes for a few days, and the water should not become cold during that time. For operation in cold climates, therefore, it is advisable to provide thermal insulation. This can take the form of fibrous batts 35, which are placed between the outer wall 23 of the shipping-container and the inner skin 26, and between the studs 25.

Alternatively, insulative foam may be injected or sprayed into those spaces. The foam may be of the type that sets rigidly, which can be effective to assist in mechanically bracing the inner skin with respect to the outer-wall. It is not ruled out that inserted batts of insulation can have some effect to provide rigidity and support for the liner; however, generally, support for the liner comes from the studs 25 when the insulation is in the form of inserted batts. It may be noted that the steel studs 25, though occupying only a small fraction of the area of the walls of the container, might account for more than half the heat loss from the wastewater. The use of injectable foam, if properly engineered, can provide enough physical support, and thus can avoid the need for studs, and this can lead to a large improvement in heat insulation. Alternatively, where studs are provided, and thermal insulation is important, the designer may specify that the studs be of an insulative material, in which case the sheet steel panels may be secured to the studs with adhesive and sealant, rather than by welding.

It can be effective to apply insulative material to the outside surface of the shipping-container. Sprayed-on foam insulation is suitable in this case. Such foam may be applied after the treatment station has been installed, especially to the roof of the container and underneath the floor, if it is found that not enough insulation was provided originally.

The shipping-container shown in FIGS. 1, 2 has thus been converted into a wastewater treatment station. The treatment station may be a septic tank, for instance. In that case, in use, there will be a depth of water inside the interior chamber, of say two metres deep, and the designer must see to it that the mechanical bracing and water-tightness provisions are adequate for the task. It may be noted that the manner of construction as described herein makes it easy for the designer to provide those needs, in an economically practical manner.

The wastewater treatment station may alternatively take the form of an aerobic trickle filter. Here, the hollow interior is filled with blocks of soft foam (in the manner as described in patent publication U.S. Pat. No. 5,707,513 for example), and the wastewater is sprayed down onto the blocks from above. In that case, there is no standing body of water inside the chamber, and the standards to which the liner or inner-skin is mechanically braced and sealed may be relaxed. However, the designer is aware that if the drains for conveying treated water away should become blocked, now the chamber might fill with water, and so the standards cannot be relaxed too much.

Figure 3:
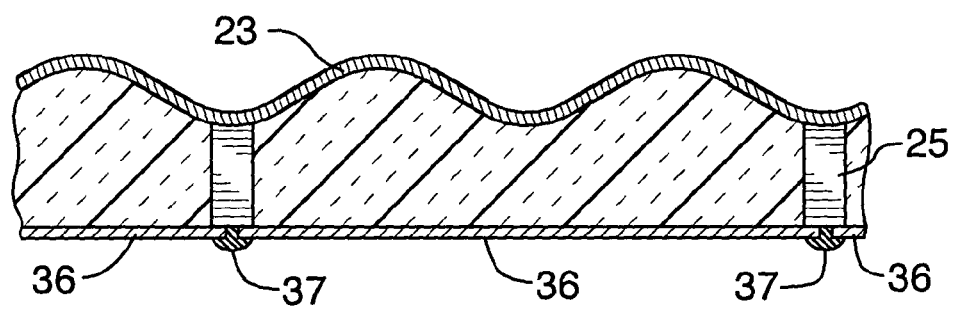
FIG. 3 is a close-up of a portion of the wall of the container of FIG. 7.
Figure 4:
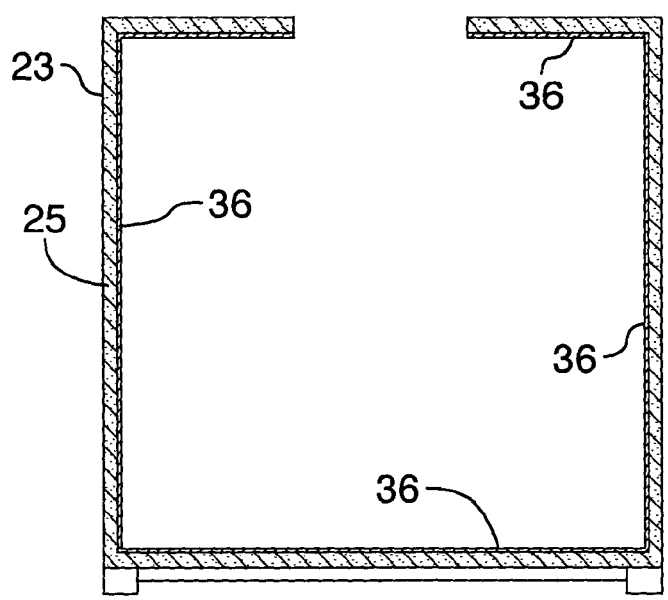
FIG. 4 is a vertical cross-section of another shipping-container.

FIG. 3 shows a shipping-container in which the sheets 36 that make up the inner-skin are of plastic, e.g polyethylene, rather than metal. Like metal sheets, the (flat) plastic sheets need to be continuous-seam-welded or bonded along their edges to make the watertight hollow inner chamber, or liner-chamber (FIG. 4). With most wastewaters likely to be encountered, polyethylene is substantially inert, and there is no need for the overall layer of the coal tar epoxy, as was appropriate when steel sheets were used. But for added security, the designer might prefer to specify that the epoxy, or other sealant, be provided at least along the welded or bonded seams 37.

Polyethylene sheets can be seam-welded by blowing hot air on the seams. However, oxidation difficulties can require that hot nitrogen gas be used, rather than hot air. Carrying out the operation of welding polyethylene sheets actually inside the shipping-container can therefore pose some difficulties. That being so, it might be preferred that most of the sheets that will go to make up the liner, and sometimes the whole liner, be welded up outside the container, and the assembly or sub-assembly then slipped inside the container (through the doors 28). It may be noted that the shipping-container by its nature lends itself to flexibility in respect of the manner of constructing the liner.

Figure 5:
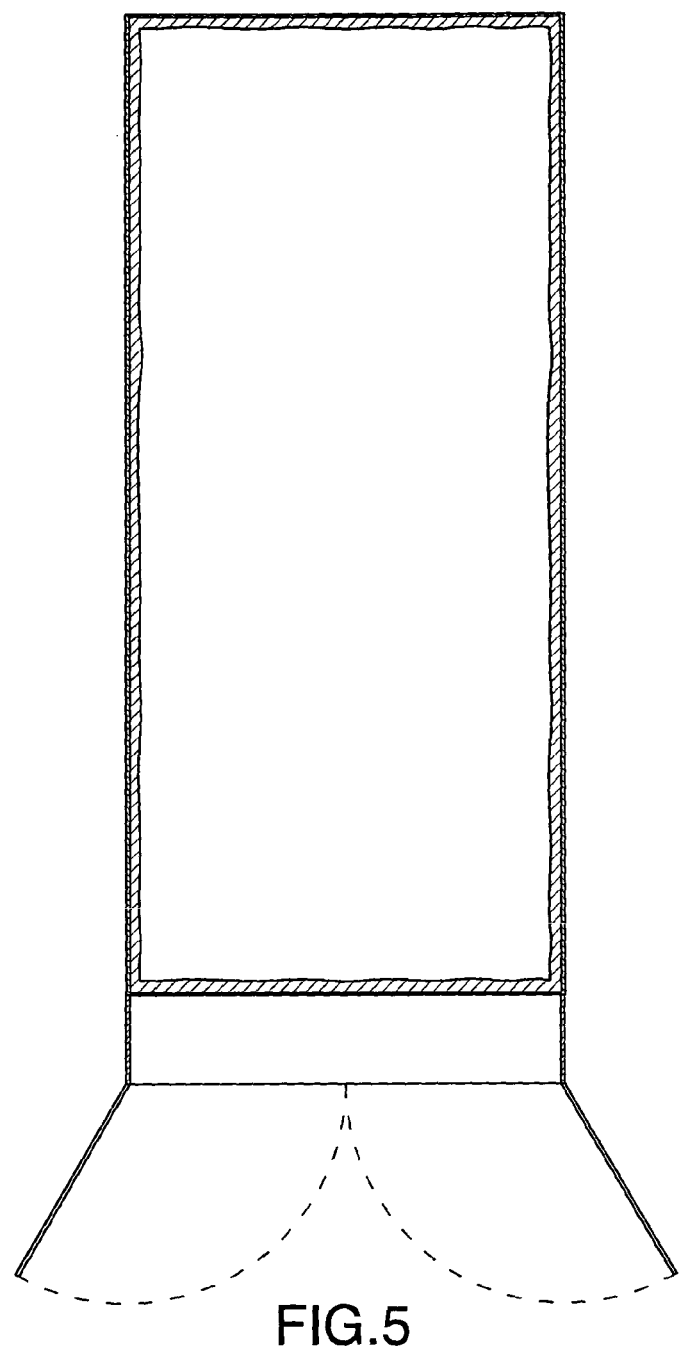
FIG. 5 is a plan view, in cross-section, of another shipping-container.
Figure 6:
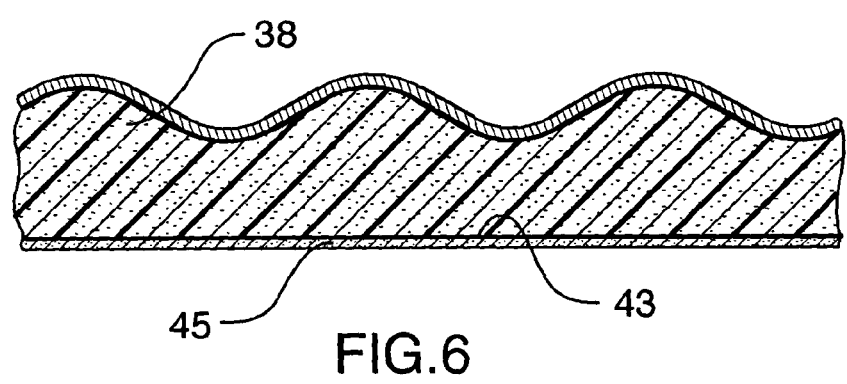
FIG. 6 is a close-up of a portion of the wall of the container of FIG. 5.

FIGS. 5, 6 show another alternative construction of the liner. Here, polyurethane foam 38 is applied, e.g by spraying, directly to the inside surface of the outer-wall 23 of the shipping-container. The inside surface is first thoroughly cleaned and prepared for receiving the foam, e.g by sand-blasting. A coat of primer is applied also.

Figure 7:
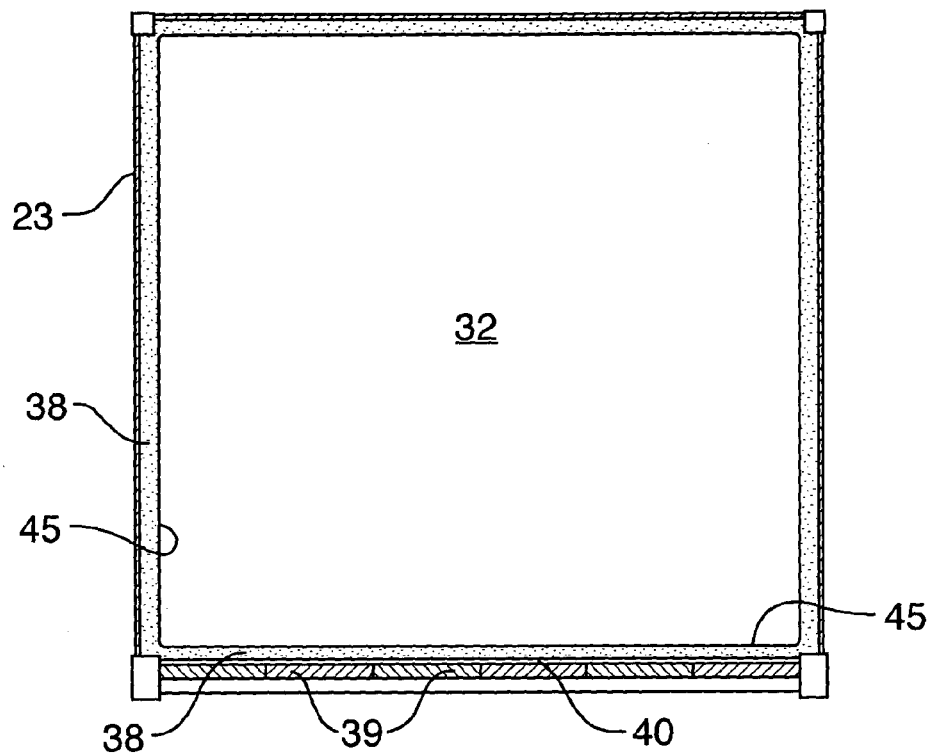
FIG. 7 is a lateral cross-section of the container of FIG. 5.

When the liner is formed from the polyethylene sheets 36, or by spraying, it will be preferred that the floor of the container be reinforced. As shown in FIG. 7, the floor panel of a shipping-container is generally of wooden planks 39 laid on the metal joists that span the floor portion of the container skin. For the purposes of making a wastewater treatment station, as in the invention, the wooden floor boards preferably are left in place, and are covered over by a steel floor-sheet 40.

Such a floor sheet may be used in the configuration of FIG. 1, the floor-sheet 40 being seam-welded to the other sheets 27 that form the liner-skin, in that case. In the configuration of FIGS. 5, 6, where the walls and ceiling of the liner do not include welded steel sheets, still the floor-sheet 40 is laid over the floor boards (FIG. 7); now, the floor sheet 40 is seam-welded to the inside frame members that run along the edges of the floor-structure of a standard shipping-container. The upper surface of the floor-sheet 40 is sand-blasted, etc, and then foam 38 is applied as with the walls (and roof) of the container.

In FIGS. 5, 6, 7 the sprayed layer 38 of polyurethane foam protrudes three or five cm inwards from the walls of the shipping-container. The inside surface 43 of the polyurethane may follow the corrugations of the outer-wall, but preferably the inside surface 43 should be flat, or at least should be not so corrugated as the container-walls themselves.

The polyurethane foam 38 is not suitable to be contacted directly by the wastewater. An inner shell 45 or liner is applied to the inside surface 43 of the foam, being sprayed-on poly urea material, preferably 0.05 to 0.08 inches thick. This material sets to a very hard and rigid (and watertight) layer.

As mentioned, when the watertight-lined shipping-container is configured for use as an aerobic filter treatment station, the margin for supporting a large hydraulic head of water can be relaxed a little.

Figure 8:
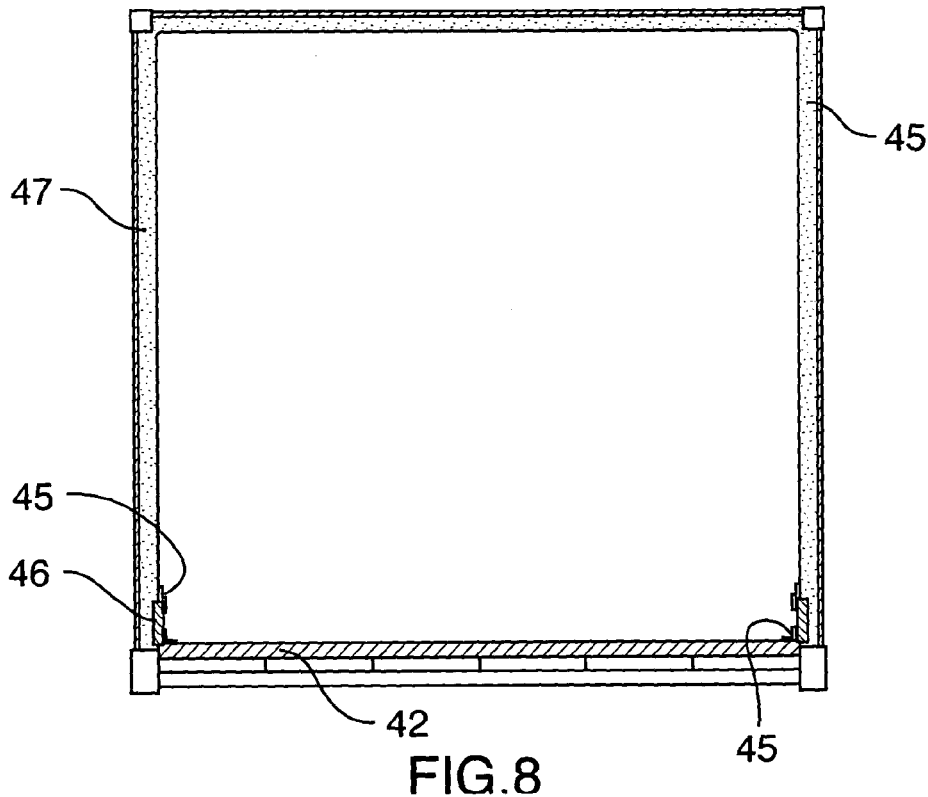
FIG. 8 is a lateral cross-section of another shipping-container.

An alternative preferred manner of construction is as shown in FIG. 8, in which a tray of welded polyethylene sheets is laid over the floor of the shipping-container. The tray includes baseboards 46 of polyethylene sheet material extend a few inches up the side-walls, but the main height of the vertical side-walls of the container is sprayed with polyurethane foam 47, and then the poly urea coating 45 is applied on top of that, as previously described.

Some further aspects regarding the manner in which a shipping-container can be configured as a septic tank will now be considered.

It has been described that the liner for the shipping-container may be formed (a) by inserting a pre-made tank or tanks into the container to serve as the liner; or (b) by fabricating the interior of the container as a watertight tank to serve as the liner, in one of the configurations as described above. Both the pre-made inserted tank liner and the made-inside tank liner can have plumbing connections on the door end of the container, for ease of connection.

Figure 9:
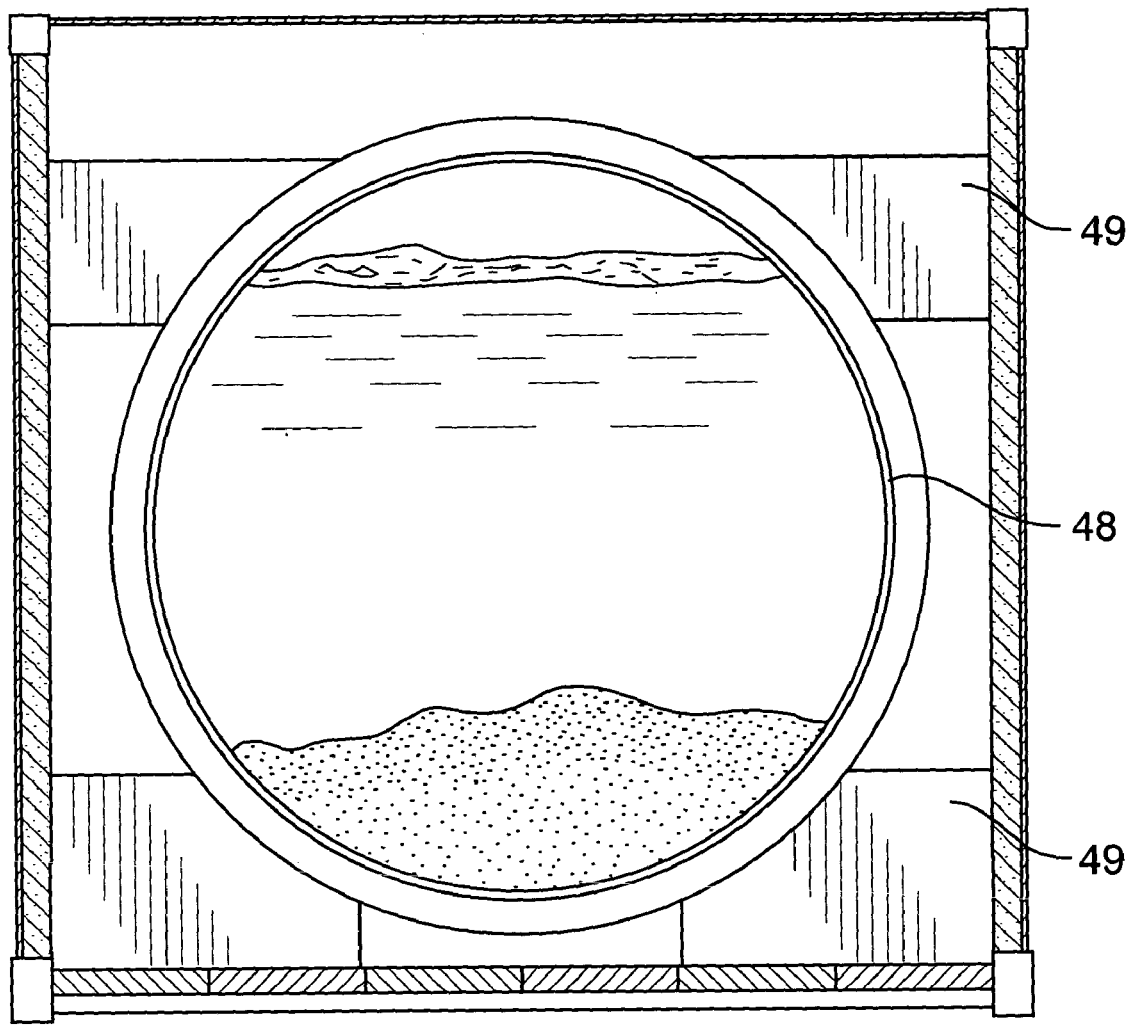
FIG. 9 is a lateral cross-section of a lined sea-freight container, in which the liner is formed from a cylindrical pipe.

A pre-made inserted container-liner tank may be provided in a number of ways. In one case, the container-liner comprises a cylindrical pipe, capped at its ends (FIG. 9). The pipe 48 is of large diameter, and may be, for example, the type of double-walled polyethylene culvert pipe, in which a plain right-cylindrical inner pipe fits inside an outer wall which is corrugated into hoops. Alternatively (not shown), the tank may be in rotation-moulded segments of e.g 80"–87" outside diameter, which fit easily into the interior space of a standard sea-freight container.

The cylindrical pipe-tank 48 must be strong enough to support the weight of water inside without undue flexing, and is supported by a rigid framework 49. The framework is also robust enough to prevent movement of the tank during transportation and installation—when of course the tank is empty. Using cylindrical pipes to form a tank has the advantage that even large pipes can be obtained relatively economically; however, the disadvantage is that a cylindrical pipe of course does not make very efficient usage of the rectangular shape of the shipping-container.

The designer may prefer to provide the container-liner as a series of cylindrical pipes, but now placed vertically in the container. However, that is hardly a more efficient usage of the space inside the container.

A pre-made inserted tank may comprise a bladder tank (not shown) of the type used for fuel or water storage. However, bladder tanks are less preferred, in that, besides wasting space, an eight ft high bladder tank requires a good deal of rigid bracing in order for it to be properly rigidly supported from the container-walls. Two half-height bladder tanks could be installed like bunk beds in the container to avoid mechanical problems with the rubber, but this would require a more complex system of connections and fittings.

From the standpoint of making more efficient usage of the rectangular shape of the space inside a shipping-container, a custom-designed pre-made tank is preferred, which can be made to fit the rectangular space available inside a standard shipping-container. Such tanks may be of fibreglass, for example. Alternatively, as mentioned, a pre-made tank may be made from sheets of polyethylene, which are welded together outside the shipping-container, to form an enclosed tank, which is then inserted into the shipping-container.

In the case of a liner tank in the form of a cylindrical pipe 48 (FIG. 9), a 40 ft shipping-container can receive and house a pipe of nominal 78" I/D (85"–88" O/D) and 38 ft in length. Such a tank can contain approximately 30,000 liters of useful volume (assuming a standing body of water at 80% height). By contrast, if the tank is 90" square in cross section and 38 ft in length, the useful volume is approximately 50,000 liters at 80% height. If the larger size is needed, the designer needs to determine whether it is more economical to provide two shipping-containers with cylindrical pipes as liners, or to provide just one shipping-container having a custom-fitted tank as liner.

The required total volume of tank(s) is determined according to the anticipated flowrate of wastewater. Septic tanks are typically designed to retain the sewage for two days. Thus, for a design flow of 15,000 liters/day, a septic tank volume of 30,000 liters is required.

As mentioned, the liner for the shipping-container, in the case where the shipping-container is to serve as a septic tank, may be fabricated in-situ, i.e fabricated actually inside the shipping-container. In this case, the components that will make up the liner do not exist as an enclosed tank, outside of the shipping-container. The various made-in-situ liners as described above can be used. Providing a good mechanical support for the liner, i.e bracing and strutting from the highly robust container-walls, can be easier when the liner is constructed inside the container. Thus, some of the benefits of the made-inside liner are that it can be expected to achieve the most efficient usage of the space inside the shipping-container, and that direct support and bracing from the container walls can more easily be accomplished.

It is not essential that the container be thermally insulated, where the water treatment is to be done in a warm climate, or the container is to be installed inside a building, for example. In that case (FIG. 10), the watertight liner can be provided by spraying a poly urea coating 50 of e.g 0.06" thickness directly onto the inside surface of the container walls, the surface having been thoroughly cleaned and primed beforehand. Forming the watertight liner actually onto the inside surface of the container walls has the benefit of providing the maximum usage of the available space, for containing water. In this case, the liner 50 itself has no structural strength at all, but is wholly supported directly by the walls of the shipping-container.

Figure 10:
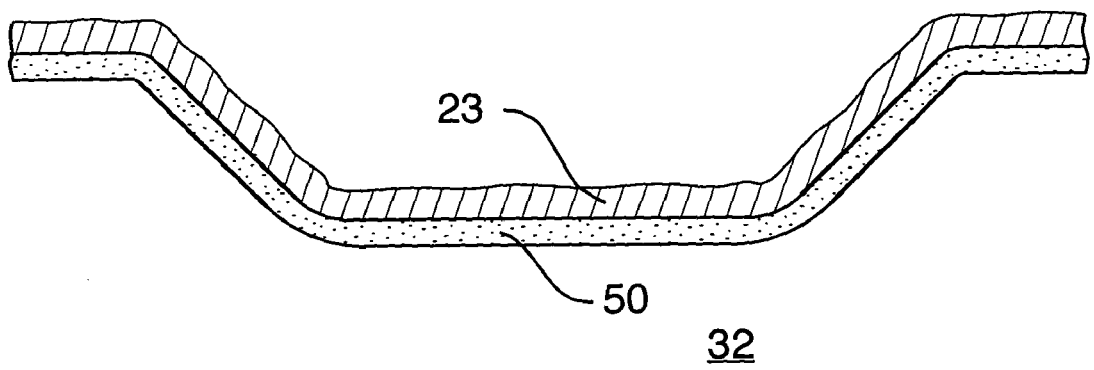
FIG. 10 is a lateral cross-section of a lined sea-freight container, in which the liner is formed as a coating applied directly to the walls of the container.

The expression—wall-support—as used in this specification reads onto the structure shown in FIG. 10. The expression signifies that the structure of the actual watertight shell or walls that define the watertight liner-chamber take physical and mechanical support from the walls of the container—either directly, as in the structure depicted in FIG. 10; or indirectly, via braces, studs, struts, rigid foam, etc, as described.

Standard sea-freight shipping-containers can be obtained with insulation already provided, being built for the purpose of shipping refrigerated items. These insulated containers often are lined, inside the insulation, with sheets of e.g aluminum or even stainless steel. In that case, the container may be prepared for use in the invention by spraying a poly urea coating onto the inside of the sheet metal, to form the watertight liner. This form of construction can be done economically, insofar as the insulated containers can be obtained cheaply.

When the lined shipping-container is configured as a septic tank, and contains a working volume of water undergoing treatment, that volume may be 50,000 liters or more. Such a volume weighs fifty tonnes, in addition to the tare weight of the container. The designer must of course see to it that the supports and foundations on which the container rests, at the installation site, are adequate to the task. And of course, there can be no question of lifting or moving the shipping-container when it contains that much water.

As mentioned, a standard sea-freight shipping-container can also be configured for use as a trickling filter for aerobic treatment. Again, the liner for the shipping-container may be provided as one or a number of polyethylene tanks arranged within the container, or may be provided as a watertight and rust-proof coated steel shell inside the container, or as a polyurethane foam plus sealant or equivalent shell, and may be insulated for cold or hot climates.

Figure 11:
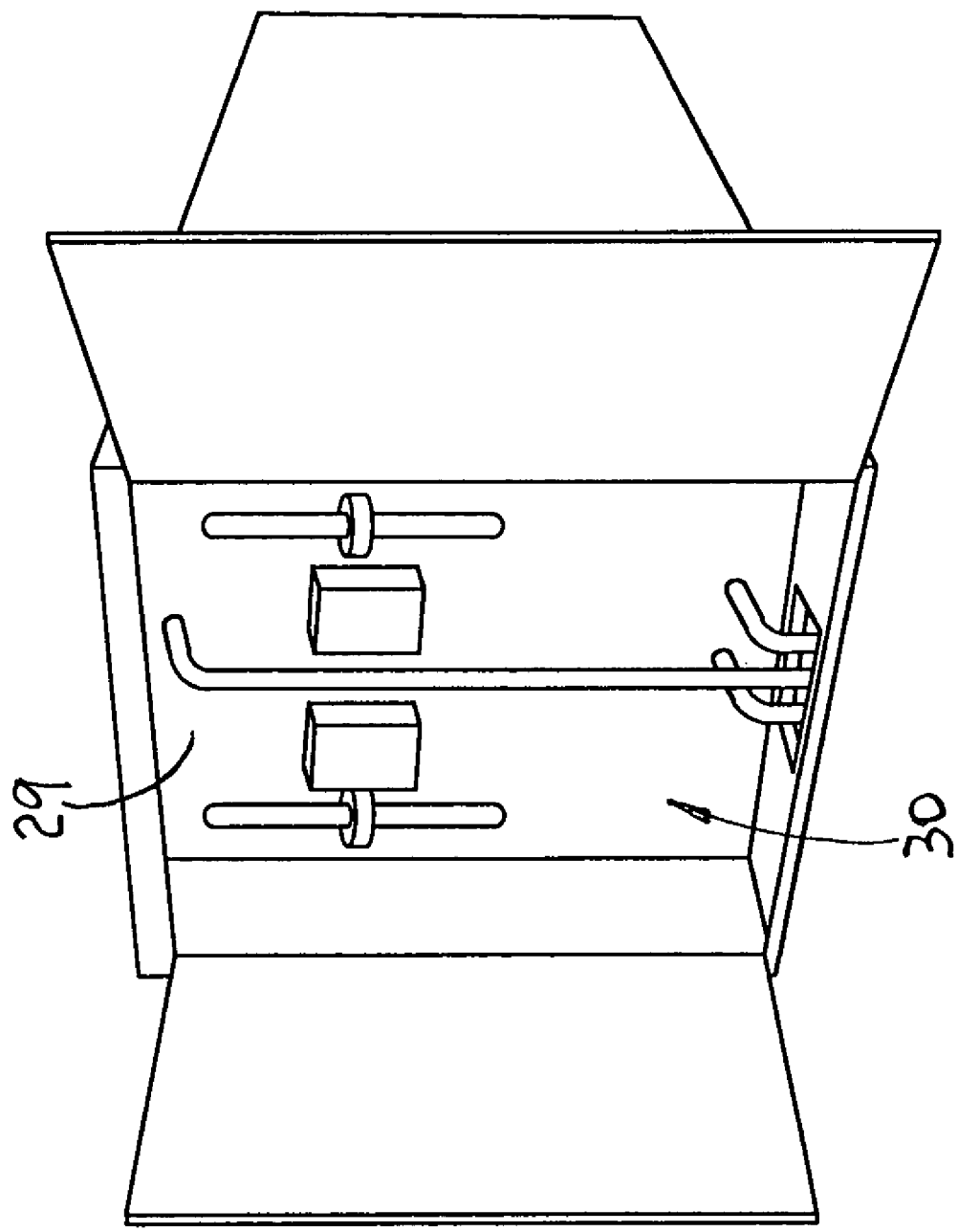
FIG. 11 is a view of a 20 ft sea-freight shipping-container, after adaptation.

FIG. 11 shows a shipping-container with an added-wall 29 installed about two feet into the container, to form a utility-room 30 for the plumbing connections, both into and out of the filter chamber, and also to contain the ventilation fans to circulate air through the filter medium. This room also houses the electrical panels and connections. In the case of more complex treatment systems, having ultraviolet disinfection, for example, and alum dosing for phosphorus removal, a larger utility room would be required.

Figure 12:
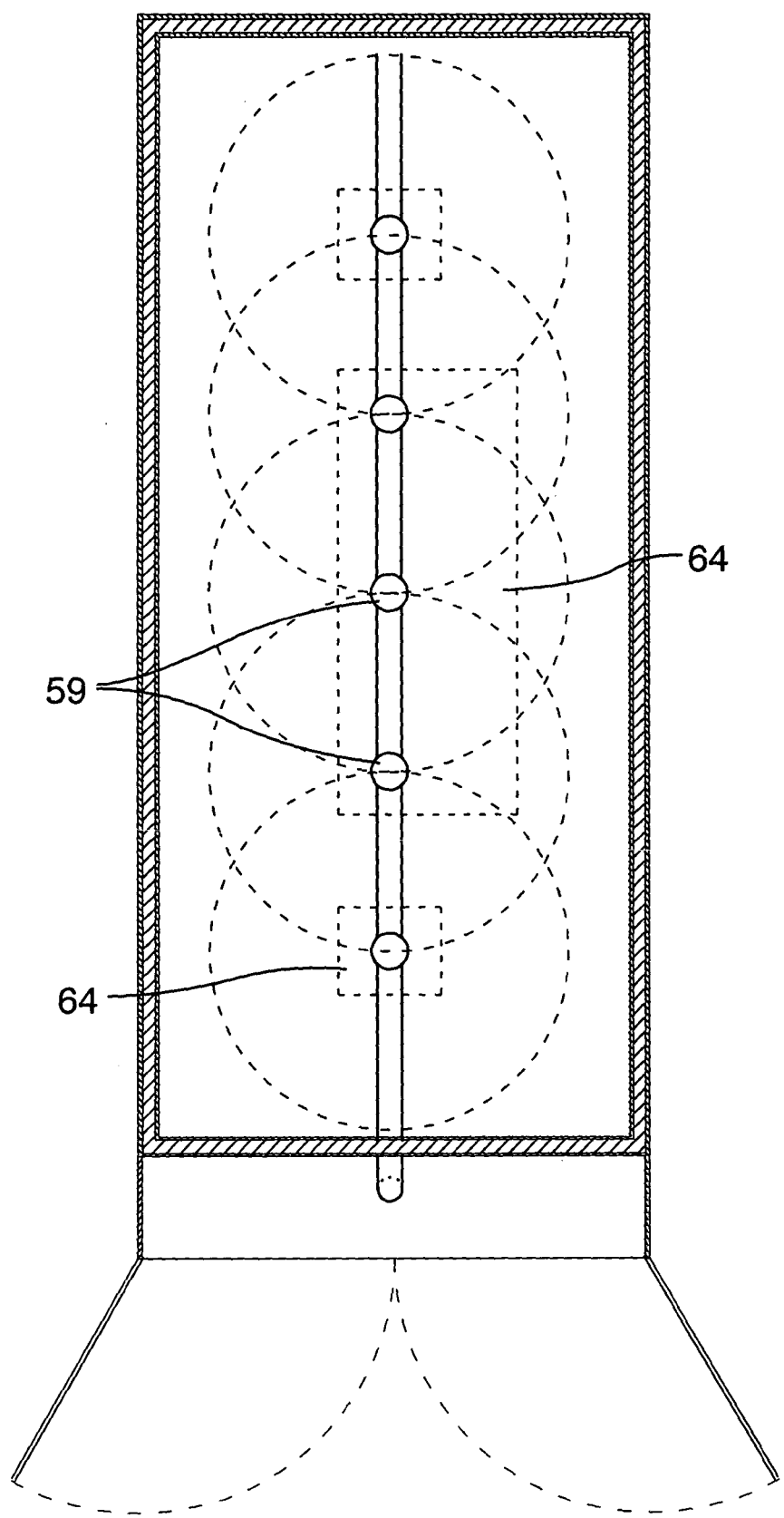
FIG. 12 is a plan view of container of FIG. 5.
Figure 13:
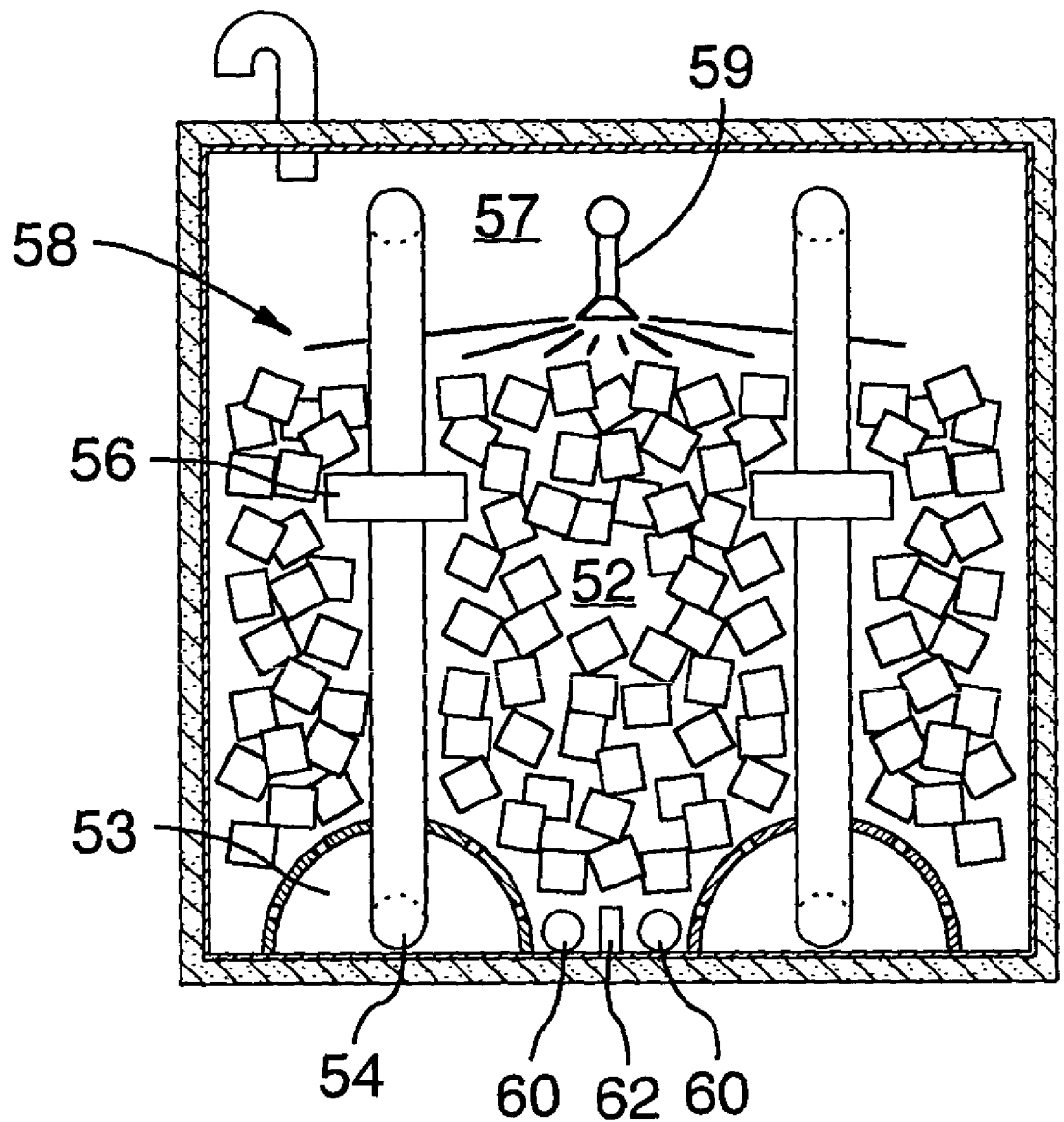
FIG. 13 is a diagrammatic end-view of the container of FIG. 5.
Figure 14:
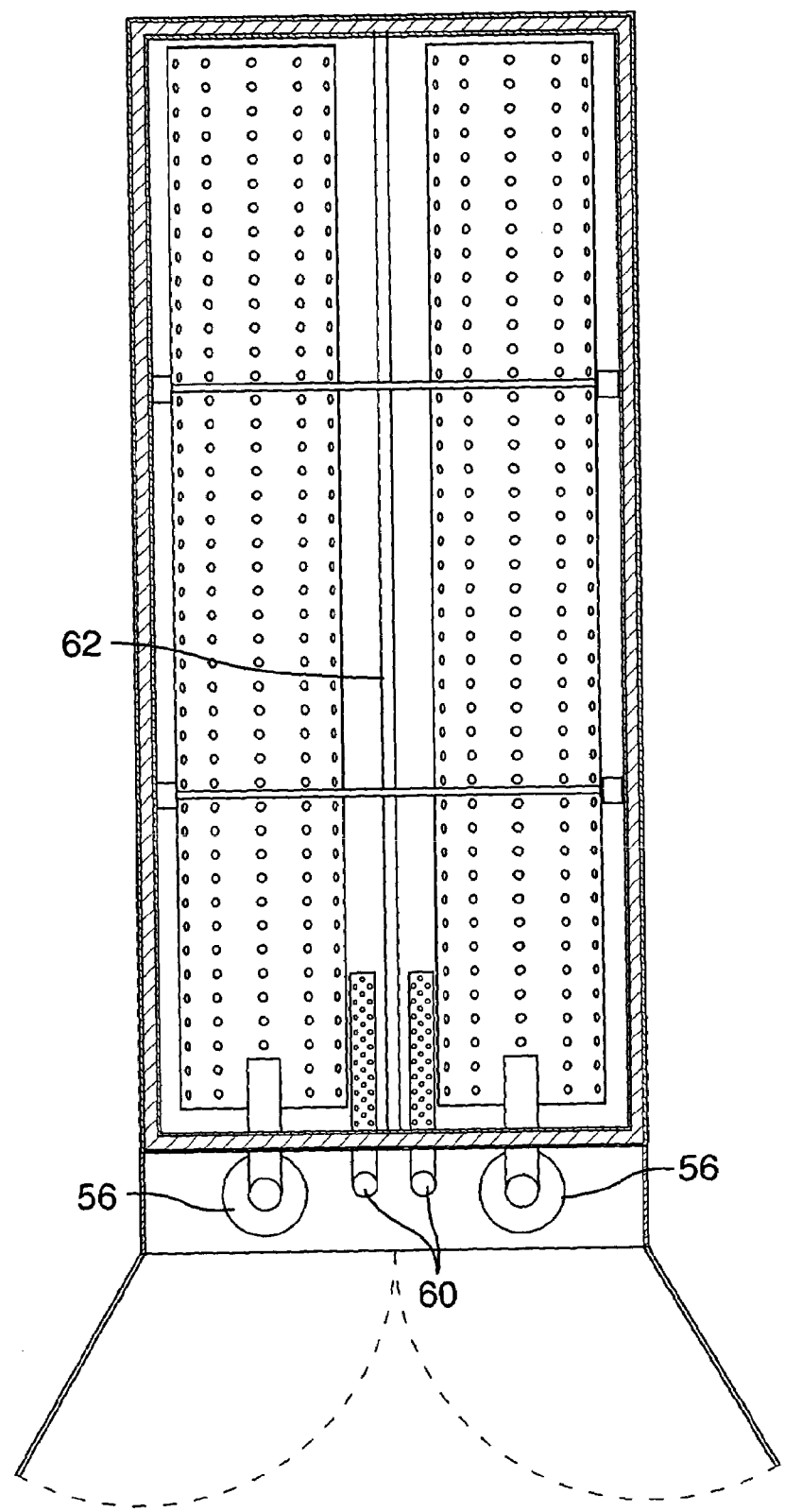
FIG. 14 is a diagrammatic plan view of a floor of the container of FIG. 5.

FIGS. 12, 13, 14 show how the shipping-container may be configured as an aerobic trickle filter water treatment station.

The filter medium 52 preferably comprises blocks of open-cell sponge or foam (see U.S. Pat. No. 5,707,513), which of course are light in weight. The use of sand or stone aggregate, or similar heavy medium, which is traditional in aerobic treatment filters, is contra-indicated for the filter medium of the shipping-container. If not foam, the medium preferably should be a lightweight absorbent synthetic material, in pieces to allow for capillary retention of the water with micro-biological growth on the inner protected surfaces, and with open air spaces between the pieces.

Alternatively, the filter medium may be comprised of vertical hung sheets of absorbent textile, or as blocks of rock-wool type material, or as lightweight aggregate material, or as rolls of convolute-cut open-cell foam slabs arranged in vertical oriented cylinders each below one spray nozzle.

Inside the filtration container, a series of air conduits, in the form of cut-in-half plastic pipes 53, are situated on the floor, and the filter medium 52 is heaped on top thereof. The half-pipes 53 are perforated, in a manner to let air and water pass through the plastic material, but to hold up the filter material 52. Extraction pipes 54 draw air from these air conduits 63 through an in-line corrosion-resistant fan 66, and blow the air into the upper part 57 of the liner-chamber 58, above the filter medium 52. Thus, air circulates constantly down through the filter medium, keeping the filter medium 52 aerated and fresh. The liner-chamber 55 is vented to the outside in one or two places, with natural or forced convection, and with activated charcoal filters for odour when necessary.

Downward-facing spray nozzles 59 attached to the ceiling of the filtration liner-chamber 58 distribute the wastewater received from septic tanks evenly over the surface of the filter medium 52. The water percolates slowly down through the medium to the floor, and out the drain 60 at the added-wall end of the floor of the aerobic chamber.

As shown, the floor of the aerobic chamber is split in two, longitudinally, by means of a three-inch-high barrier 62. This divides the water collected from the filter medium into two (equal) streams. One of these streams is recirculated back to and through the septic tank, and the other stream goes for disposal. Other recirculation splits and configurations can be made if needed. It may be noted again that the structure needed to effect the splits and configurations can be built into the containers in the factory, where skilled operators can apply strict quality control measures to ensure proper construction and performance. This may be contrasted with installations where the components are only built up into a system largely at the installation site, in which case the prudent designer tends to avoid sophisticated split flows, and the like.

The importance of this difference should be emphasized, in that it is mainly because the treatment station is finished, or is very nearly finished, as to its complete construction, actually in the factory, and then shipped in the finished state, that various sophistications and efficiency measures can be countenanced at all. It is because the shipping-container is itself configured as the water treatment station that the notion can be contemplated, of finishing the construction of the station actually in the factory, with the confidence that the unit that is installed at the site can be relied upon to be the same as when it was manufactured in the factory.

Drains and plumbing connections are made through the floor of the utility-room 30 at the door end of the filtration liner-chamber, for easy access to the fixtures and components. The fan 56 is also set onto the added-wall 29 in the utility-room, with air vents going through the wall at a convenient height.

As described, the invention may be used to provide a very cost-effective form of septic tank in a shipping-container, in which sewage water is received directly from the sewage source; the septic-treated water may then be discharged to an aerobic treatment station, such as a tile-bed soakaway, or a trickle-filter station such as an aerobic filter station of the kind as depicted in the said U.S. Pat. No. 5,707,513. Also as described, the invention may be used to provide a very cost effective aerobic trickle filter station in a shipping-container; here, septic-treated water may be received from e.g a traditional in-ground concrete or plastic septic tank. After aerobic treatment, the water is clean, and may be infiltrated into the ground, or otherwise discharged.

Figure 15:
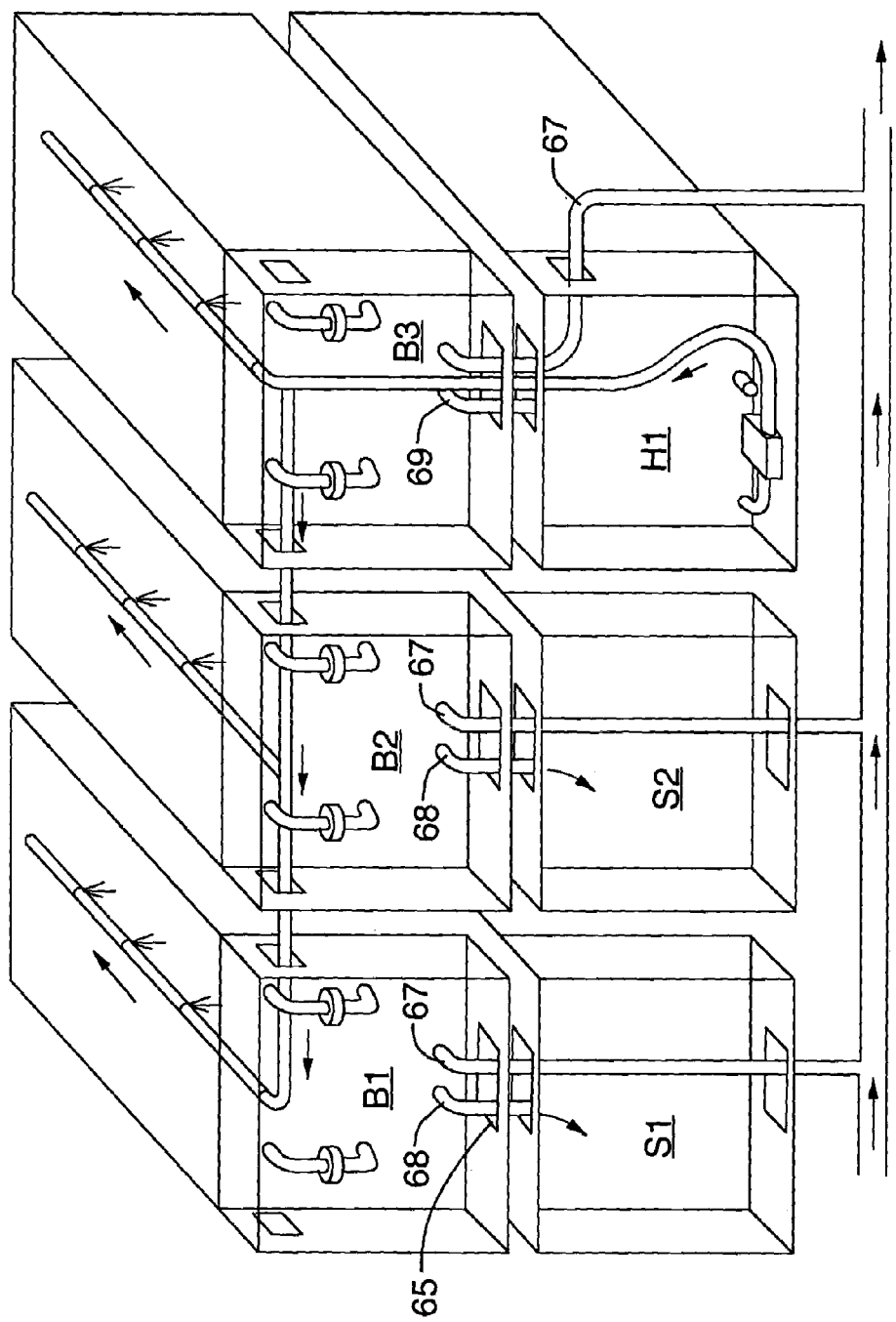
FIG. 15 is a pictorial diagrammatic view, showing six shipping-containers that have been adapted for use as wastewater treatment tanks, in accordance with the invention.

However, a major benefit of the invention is that it enables a whole treatment facility to be made from shipping-containers. That is to say, direct sewage is received into a first shipping-container which is configured as a septic tank, then the water is passed to a second shipping-container which is configured as an aerobic filter. Several shipping-containers may be provided, as dictated by the water through-flow requirements of the installation. Thus, several of the lined shipping-containers can be configured as septic tanks and aerobic filters, to form a modular treatment system, which may be adapted very cost-effectively for small to medium sized systems. FIG. 15 shows a set of two septic tank containers S1, S2, a holding tank H1, and three aerobic filter containers B1, B2, B3.

The several containers are pre-manufactured in-factory, and shipped to the site. The designer specifies how the various containers are to be connected up, once installed in place, with by-pass flows, feedback flows, coordinated controls, etc, of a complex degree of sophistication, and can be reasonably sure that even an unskilled installation contractor can and will simply make the appropriate connections on site. And if a mistake should be made, on site, it is generally a simple matter to detect and correct it.

By contrast, it has been regarded as imprudent to design a sophisticated active system with traditional components, because traditional water treatment components are, to a large extent manufactured actually at the site. The designer has to cater for the fact that, sometimes, the work may be done by installation contractors who may not be skilled specialists in the theory of water treatment. But when the components are all manufactured in-factory, and shipped to the site in shipping-containers, and the installation contractor need only connect up the pipes and wires according to a pre-set plan, now even the most prudent designer is comfortable introducing sophistication into the system.

Figure 16:
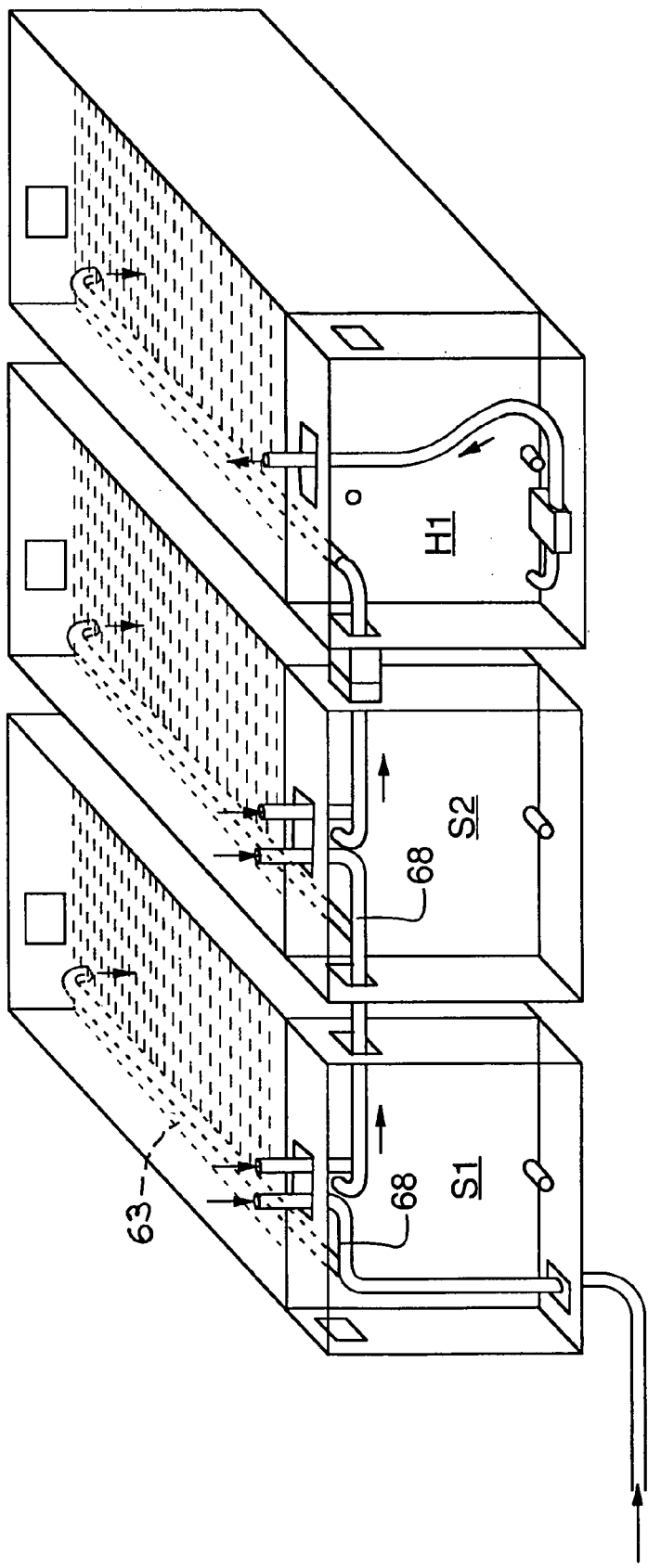
FIG. 16 shows the bottom three containers of FIG. 15, in more detail.

In FIG. 15, the septic tank S1, S2 and holding tank H1 containers are placed on the ground level, and the filtration containers B1, B2, B3 are stacked directly on top thereof, whereby gravity aids in the recirculation from the filtration chambers to the septic tanks, thereby minimising the number of pumps required. (FIG. 16 shows the septic tanks with the aerobic filtration tanks removed.) ISO sea-freight containers are designed to be stackable, and a height of two containers is useful to minimize the footprint, and is acceptable from an aesthetics and operational viewpoint, being only sixteen feet high or so. The containers could also be placed below grade in a concrete enclosure or inside a building, if required, but preferably not buried directly in contact with soil, since this requires excavation and disposal of soil, and might encourage premature oxidation of the steel housing.

The manner of arranging the pipes and conduits, and plumbing and electrical fittings, using the utility rooms of the various containers, is shown in FIGS. 15,16. The inlet pipes 63 for the septic tanks (FIG. 16) extend the length of the septic tank, whereby the sewage has to flow from the far end towards the door end, i.e to flow the entire length of the septic tank before exiting, thereby ensuring maximum retention time and optimal biological treatment.

Hatches 64 are cut in the roof of the aerobic filtration containers B1, B2, B3, as shown in FIG. 12. Such hatches should be made flush to the outline of the container, whereby shipment may be done as an ISO container and not as more expensive common freight. The hatches 64 are cut-out holes with flat steel covers either bolted or hinged with a rust-resistant piano-type hinge. For the filtration containers, small hatches are located directly above the spray nozzles 59 to allow clearing of the nozzles, and larger hatches are installed for manways and for installing the air chambers and the filter medium.

For septic-tank containers placed underneath other containers, of course a roof hatch would be inaccessible, and an exterior hatch for clean-out purposes can be provided in the added-wall 29.

In an alternative arrangement (not shown), where multiple septic-tank containers are arranged physically in series, it might not be appropriate to run transfer-pipes between the septic tanks all through the door end, in which case a side-wall or back-wall port or hatch can be provided, to transfer effluent (from an intermediate depth) to the next septic tank.

In FIG. 15, the raw sewage is pumped to the first septic tank S1 with no pre-treatment except a grease trap for any commercial kitchen wastewater. The sewage enters the inlet end of the tank, and passes through the length of the tank to the outlet. Sludge and scum are physically separated as the water migrates along the tanks. Fermentation and hydrolysis reactions become established, which break down large molecules into gases and into more soluble components, and liquefy the sewage in preparation for aerobic treatment.

The outlet of the first septic tank S1 may empty into a screen basket to remove some large solids before it enters the second septic tank S2, or may go straight to the second tank S2. Having the screen outside the tanks eases servicing, but the intent is to keep solids inside the septic tank, to degrade there instead of being screened outside the tank. The second septic tank S2 serves to continue the fermentation process so that the sewage can be more readily decomposed by aerobic filtration.

The containers have access ports 65 through the side walls through which the tanks are connected, with suitable pipes, after the containers are in operational position.

Aerobic trickle filter treatment generally requires that influent sewage water be applied in periodic doses, rather than as a continuous flow, onto the filter medium. Thus, the water from the septic tanks should be held, e.g in a holding tank, until enough volume builds up to activate a float switch, which operates the dosing pump to delivery a pre-set dose-volume of water to the spray nozzles 59. The holding tank is provided as (another) lined shipping-container, as required.

The holding tank container H1 is made like the septic tank, but smaller, which leaves room for a larger utility room, which is useful in that the holding tank may house more pumps and flow control valves. Because the liner-chambers are leak-proof, the utility room can house the main electrical supply panel and the pump control panel. Preferably, the pumps are jet-style pumps, housed outside of the pump tank, i.e located in the utility room, for ease of service, rather than submersible pumps housed inside the tanks. A holding tank suitable to dose the filtration tanks B1, B2, B3 is typically sized at 30% to 50% of the designed daily flowrate; for a flow of 15,000 liters/day, the holding tank should be 5000–7500 liters capacity.

The second septic tank S2 empties into the holding tank H1. The effluent is then dose-pumped to the filtration tanks B1, B2, B3 on the upper storey, using pumps adequately sized to pressurize the spray nozzles 59 at about ten psi. Ideally, three jet pumps are used, each to dose the filtration container above them. This configuration minimizes the size of the pumps and the number of fittings or rotating valves.

All three filter-containers shown in FIG. 15 may have dividing barriers, like the barrier 62 in FIG. 14, and water from the right halves of the containers drains away for disposal via discharge pipes 67. Water from the left halves of the filter containers drains, under gravity, Into the containers below; thus, the effluents from the left sides of B1,B2 drain respectively back Into the septic tank containers S1,S2 via pipes 68, and effluent from the left side of B3 drains back into the holding tank H1 via pipe 69.

In most cases, it will be more cost-effective to recirculate the water undergoing treatment back through the septic tank and filters, than to pass the water through the various containers in sequence, just once through, and then to simply discharge the treated water.

There are two preferred configurations as to the manner of recirculation, their use depending on the type of wastewater expected, and the quality of the effluent required. In the first configuration, as shown in FIG. 15, two thirds of the effluent from the filter containers goes back to the septic tank, and one third is discharged. This is useful for standard to moderately heavy sewage. The use of the two septic tanks for recirculation allows ease of installation but also allows two-thirds recirculation without hydraulically overloading the first septic tank S1 where most of the sludge and scum are separated.

Figure 17:
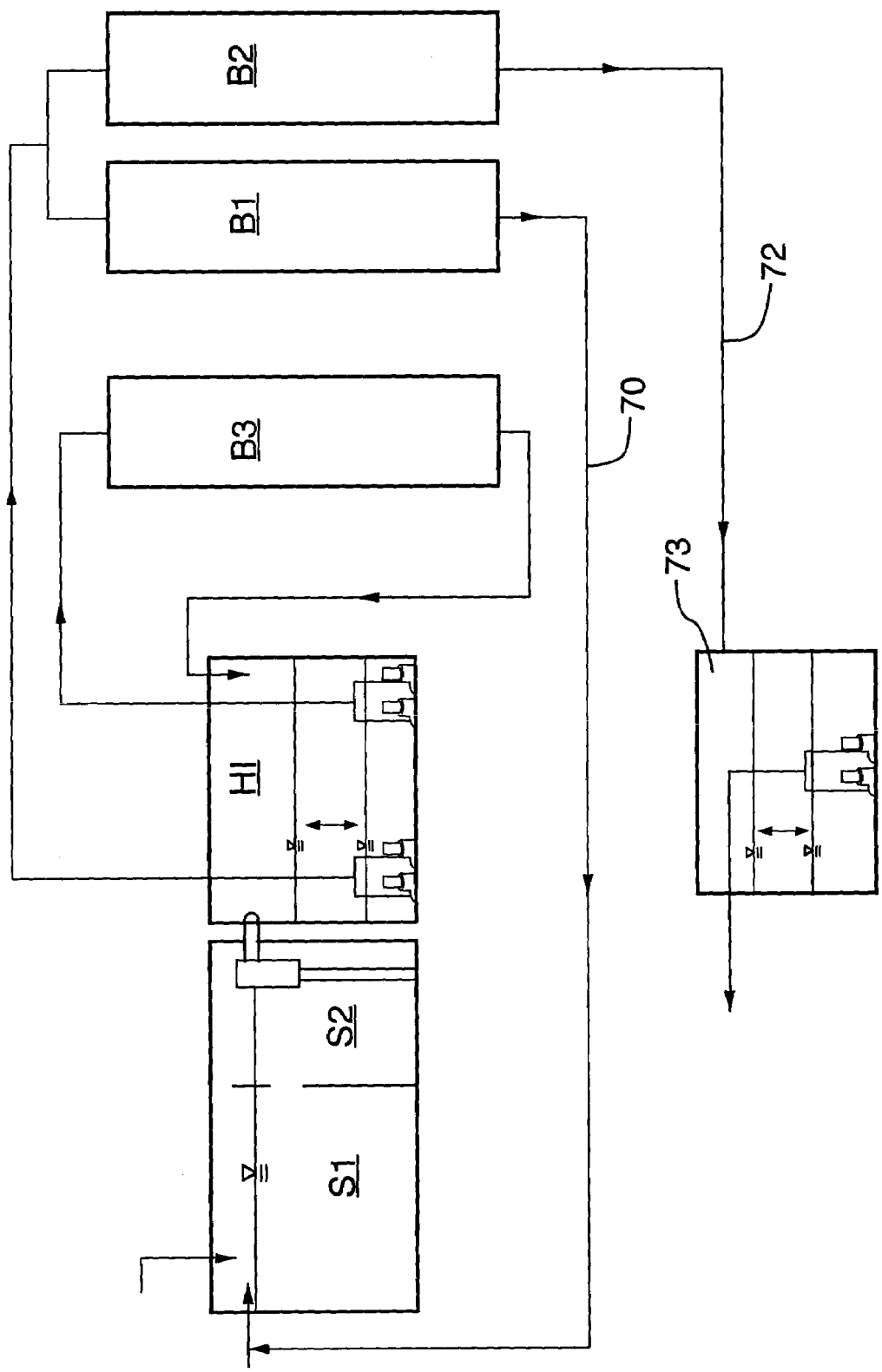
FIG. 17 is a diagram showing how water undergoing treatment is routed around the various elements of a treatment station.

In the second configuration (FIG. 17), half 70 of the effluent from the filter containers B1,B2 goes back to the septic tanks S1,S2, and the other half 72 is discharged. The third filtration container B3 is on a 100% closed loop cycle beck to the holding tank container H1. This configuration is useful for heavy duty sewage, and to cater for unusual or unknown volume variations, and is especially helpful for removing nitrogen and for meeting ammonium levels In the effluent. The effluent from the first filtration container B1 is drained into the first septic tank directly below it; the effluent from the second filtration container B2 resting on the second septic tank is drained to disposal, via an ultraviolet disinfection unit 73. All the effluent from the third filtration container B3 is drained to the holding tank H1 directly below it.

The third filtration container B3 on the 100% closed loop can be dosed at much higher hydraulic loading rates than the first two filtration units B1, B2 (using a separate dosing control-cycle), because the effluent returns to the holding tank H1 and does not interfere with the hydraulic loading through the septic tanks S1,S2; and, because that effluent is not going to disposal or ultraviolet disinfection, the amount of suspended solids in the effluent water is not important. The benefit of this 100% B3-H1 cycle is the ability to remove unusual amounts of organic matter, and to remove nitrogen through continuous (aerobic) nitrification and (anaerobic) denitrification. It will be noted again that it is the fact of configuring the lined shipping-tanks as water treatment stations, and the fact that same are manufactured in-factory, which permits such complex arrangements.

Figure 18:
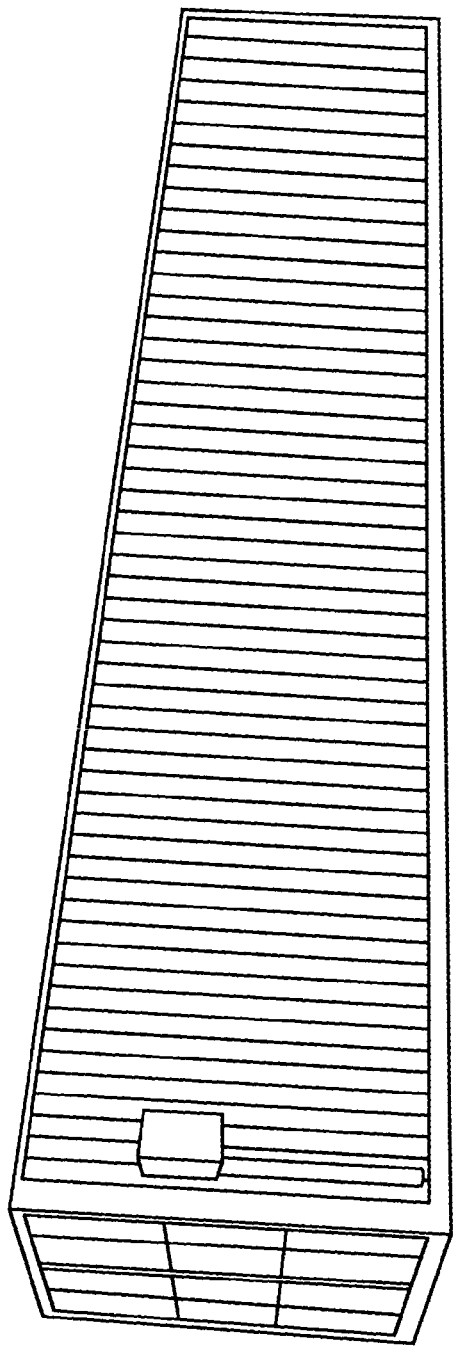
FIG. 18 is a pictorial view of a 40 ft sea-freight shipping-container, adapted for use in the invention.
Figure 19:
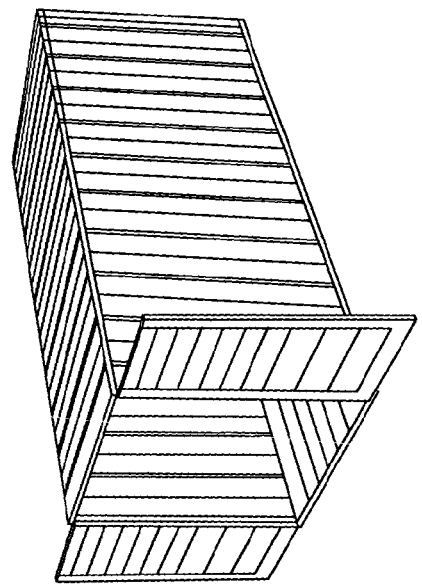
FIG. 19 is a pictorial view of a 20 ft sea-freight shipping-container, before adaptation.

FIG. 18 shows a 40 ft ISO standard sea-freight shipping-container, that has been adapted for use in the invention, and has been installed at a site, and is in operation. FIG. 19 shows a 20 ft ISO standard sea-freight shipping-container, prior to the start of the adaptations for use in the invention. Other ISO standard sizes of shipping-container are available, including a 10 ft-long size, and a 48 ft-long size. Where appropriate, these may be configured with watertight liners, as described; however, the economics of converting a shipping-container into a water treatment tank, in the manner as described, are most favourable for the 20 ft and 40 ft sizes.

Figure 20:
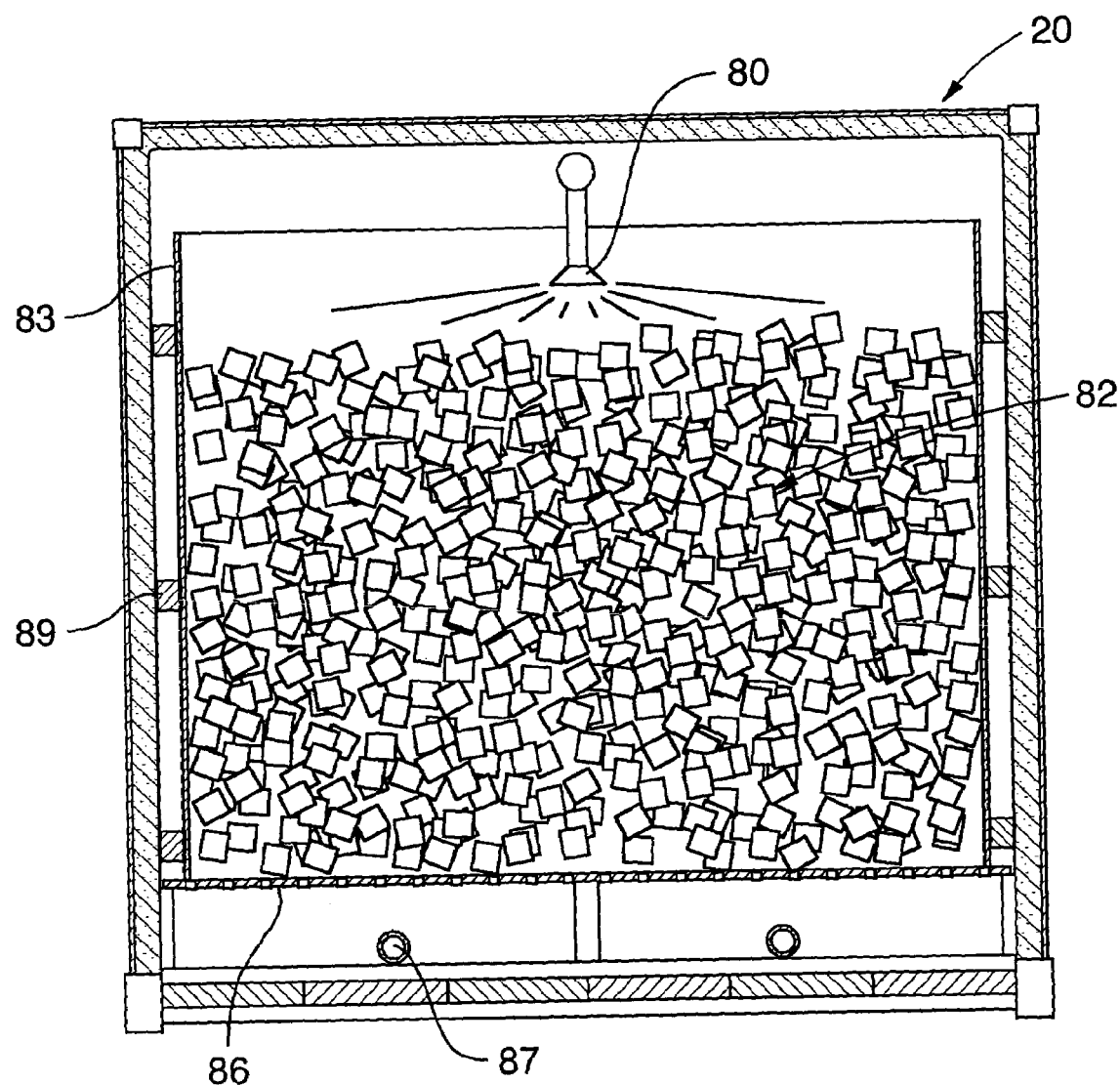
FIG. 20 is a lateral cross-section of a lined sea-freight container, in which the liner is formed from a cylindrical pipe in an upright position.

As mentioned, the container-liner may be provided as an in-line series of cylindrical pipes, but now placed vertically upright in the container. FIG. 20 is an example of this. Water requiring aerobic treatment is sprayed down from a spray-head 80 onto blocks 82 of interconnected-cell foam. The blocks 82 are housed in a liner-chamber defined by an open-ended upright cylinder 83, there being several such cylinders disposed along the length of the container 20. A perforate platform 86 supports the blocks, and water draining down through the platform is collected in conduits 87. The cylinder 83 is supported from the walls of the container by means of braces 89. Air can percolate up/down through the foam blocks, or fans may be provided to force an airflow.

Some further points re the invention will now be considered.

It may be regarded that the invention in this case lies in the recognition that standard shipping-containers can be economically adapted to make excellent water treatment tanks. It is a simple matter to provide a 1000 cu.ft (30 cu.m) water tank inside a 20 ft standard container, and a 2100 cu.ft tank in a 40 ft container. While the invention can be used with shipping containers other than standard ISO 20 ft and 40 ft sea-freight shipping containers, the invention does have a size limitation, in that a container can be too large. The invention gains much of its benefit because the container is a shipping-container; this is what enables the apparatus, rather than being manufactured on-site, to be manufactured in-factory, and shipped to the site—the designer being sure that the apparatus will be unaffected by the act of shipment.

A container that is so large that it cannot be shipped is not a shipping container in the context of the invention. For a container to be described as a shipping-container, in the context of the invention, its nominal volume has to be less than about 4,000 cu.ft. The benefit of using ISO standard sea-freight shipping-containers is that, because they are standard, they can be provided relatively cheaply. But the invention does include shipping containers other than shipping containers made to the ISO standard dimensions.

For a container to be described as a shipping-container, it also has to be capable of being picked up, as a unitary structure, and deposited e.g on a truck, substantially without being distorted, in the manner of a standard shipping-container.

Again, the invention is not for enabling liquids to be transported in standard shipping containers. It is intended that the container of the invention be shipped simply as an empty container, and that the liquid be put into the container only after the container has been installed at its operating site. Equally, if it becomes desirable to remove the shipping container after a period of service, the intention is that the liquid would first be taken out.

When a pre-fabricated tank is used in the invention, preferably it should be the kind of tank that is unsuitable for use as a water tank unless mechanically supported. If the inserted tank is capable of standing on its own, without support, the invention is not needed.

It may be noted that the shape of the volume of a standard sea-freight shipping-container, being long-by-narrow, is a good shape from the standpoint of efficient water treatment. The depth of water in the shipping-container tank is around six feet, which is good for promoting the largely anaerobic septic-tank breakdown reactions. The width of the water is six or seven feet, which is good for resisting the gradual development of unwanted pathways through the tank, and yet for permitting a large volume of water to remain still enough, in the tank, for settlement of solids to take place.

The table below shows some of the characteristics of sea-freight containers, of the standard 20 ft and 40 ft sizes, as adapted for use in the invention.

| Sea Freight Container | 20 ft | 40 ft |
|---|---|---|
| o/a width | 93 in | 96 in |
| o/a height | 102 in | 102 in |
| o/a area (CA) | 66 ft$^2$ | 68 ft$^2$ |
| O/a length | 240 in | 480 in |
| o/a volume (CV) | 1318 ft$^3$ (37.9 m$^3$) | 2720 ft$^3$ (77.0 m$^3$) |
| typical cylindrical pipe liner | | |
| inside diameter | 78 in | 78 in |
| cyl. inside area (LA) | 33 ft$^2$ | 33 ft$^2$ |
| LA/CA | 50% | 50% |
| cyl. inside length | 216 in | 456 in |
| liner volume (LV) | 597 ft$^3$ (16.9 m$^3$) | 1261 ft$^3$ (35.7 m$^3$) |
| LV/CV | 45% | 46% |
| contained volume of sewage (80% full) | 478 ft$^3$ (13.5 m$^3$) | 1014 ft$^3$ (28.7 m$^3$) |
| pre-fab or in-built rect. liner | | |
| inside width | 83 in | 86 in |
| inside height | 92 in | 92 in |
| liner inside area (LA) | 53 ft$^2$ | 55 ft$^2$ |
| LA/CA | 80% | 81% |
| inside length | 216 in | 456 in |
| liner volume (LV) | 955 ft$^3$ (27.0 m$^3$) | 2088 ft$^3$ (59.2 m$^3$) |
| LV/CV | 72% | 77% |
| contained volume of sewage (80% full) | 764 ft$^3$ (21.6 m$^3$) | 1670 ft$^3$ (47.4 m$^3$) |

What is claimed is:

1. Water treatment station, wherein:
   the station includes at least one shipping-container that has been configured as a septic treatment tank, termed the septic-container;
   the station includes at least one shipping-container that has been configured as an aerobic trickle filter treatment tank, termed the filter-container;
   the septic-container is a separate structure from the filter-container;
   the filter-container rests physically on top of, its weight supported by, the septic-container.

2. Station of claim 1, wherein the station includes a conduit for conveying water from the upper filter-container downwards, under gravity, to the lower septic-container.

3. Station of claim 1, wherein:
   in respect of at least some of the shipping-containers making up the station:
      a front side-wall of the shipping-container includes an outer door or doors, and includes an inner-front-wall;

the inner-front-wall is set back from the door or doors, into the shipping-container, and extends between left and right side-walls of the shipping-container, and is mechanically integrated thereto;

the inner-front-wall is so placed as to define a utility room, to which a person may gain access via the door or doors;

the shipping-container includes a liner, and the liner is formed with an inner surface layer, which defines a liner-chamber, which is suitable for holding a body of water to be treated;

at least one water conduit passes through the inner-front-wall, and makes a water-flow communication between the liner-chamber and the utility room;

conduits for transferring water between the shipping-containers lie routed through the utility rooms;

the said at least some shipping-containers are so aligned as to render routing of the conduits simple, and to provide easy access to the respective utility rooms.

* * * * *